US008943167B2

(12) United States Patent
Aurongzeb

(10) Patent No.: US 8,943,167 B2
(45) Date of Patent: Jan. 27, 2015

(54) DYNAMIC NODE NETWORKED SYSTEM

(71) Applicant: Dell Products L.P., Round Rock, TX (US)

(72) Inventor: Deeder M. Aurongzeb, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 106 days.

(21) Appl. No.: 13/714,007

(22) Filed: Dec. 13, 2012

(65) Prior Publication Data

US 2014/0173021 A1 Jun. 19, 2014

(51) Int. Cl.
G06F 15/16 (2006.01)
H04L 29/08 (2006.01)

(52) U.S. Cl.
CPC .................. *H04L 29/0872* (2013.01)
USPC ............ 709/217; 709/227; 709/228; 709/229

(58) Field of Classification Search
CPC ..... H04L 67/16; H04L 67/104; H04L 5/0035; H04L 63/10
USPC .................. 709/217, 227, 228, 229
See application file for complete search history.

(56) References Cited

U.S. PATENT DOCUMENTS

| 8,189,535 | B2 | 5/2012 | Akselsen |
| 8,233,896 | B2 | 7/2012 | Wehling |
| 2004/0117339 | A1* | 6/2004 | Thubert et al. ............... 707/1 |
| 2007/0183346 | A1* | 8/2007 | Thubert et al. ............. 370/254 |
| 2007/0223410 | A1* | 9/2007 | Oyama et al. .............. 370/310 |
| 2008/0052517 | A1* | 2/2008 | Anstey et al. ............... 713/176 |
| 2010/0033308 | A1* | 2/2010 | Muirhead ................. 340/10.1 |
| 2010/0142445 | A1* | 6/2010 | Schlicht et al. ............ 370/328 |
| 2012/0230304 | A1 | 9/2012 | Barbu et al. |
| 2012/0230305 | A1 | 9/2012 | Barbu et al. |

OTHER PUBLICATIONS

L.M. Vaquero, L.R. Merino, J. Caceres, and M. Lindner, "A break in the clouds: towards a cloud definition," ACM SIGCOMM Computer Communication Review, v. 39 n. 1, 2009.
W. McNary, *Transformational Aircraft Communication Using a Broadband Mesh Network*, 7th ICNS Conference, May 2007.

(Continued)

*Primary Examiner* — Liangche A Wang
(74) *Attorney, Agent, or Firm* — Haynes and Boone, LLP

(57) ABSTRACT

An IHS network includes a requesting mobile IHS that is moving relative to a land mass, and a provisioning mobile IHS that is moving relative to the land mass and the requesting mobile IHS. The provisioning mobile IHS has direct access to a network element that is not directly accessible by the requesting mobile IHS. The provisioning mobile IHS receives a request to access the network element from the requesting mobile IHS and provides access to the network element for the requesting mobile IHS. At least one assisting mobile IHS that is moving relative to the land mass, the requesting mobile IHS, and the provisioning mobile IHS and that does not have direct access to the network element may transmit the request from the requesting mobile IHS to the provisioning mobile IHS, and provide access to the network element for the requesting mobile IHS by the provisioning mobile IHS.

20 Claims, 12 Drawing Sheets

(56) References Cited

OTHER PUBLICATIONS

I Akyildiz and X. Wang, *A survey on wireless mesh networks*, IEEE Communications Magazine, Sep. 2005, vol. 43, Issue 9, pp. 23-30.

North Atlantic Minimum Navigation Performance Specifications (MNPS) Airspace Operations Manual, Edition 2008, published on behalf of the North Atlantic Systems Planning Group (NAT SPG) by the European and North Atlantic Office of ICAO, Aug. 2008.

\* cited by examiner

702

706

DYNAMIC NODE NETWORKED SYSTEM

BACKGROUND

The present disclosure relates generally to information handling systems, and more particularly to a dynamic node networked system using information handling systems.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Mobile networking using IHSs is increasingly becoming an essential part of people's lives. Typically, a user connects to a network such as the Internet by using their mobile IHS to connect directly to a stable network connection device providing a connection to the network such as, for example, a device providing a Local Area Network (LAN) (e.g., a wireless router), a cellular tower, a satellite, and/or a variety of other stable networking connection devices known in the art. However, if the user's IHS is not within connection range of a stable network connection device, network connectivity is not provided and the user must wait until their IHS is within connection range of a stable network connection device to access the network.

Furthermore, in some situations network connectivity may be provided to a user in a moving vehicle. For example, many airlines offer cellular and Internet connectivity in the passenger cabin. Such networked systems operate in substantially the same manner as discussed above, with an airplane IHS connecting to a stable network connection device and the user connecting their user IHS to the airplane IHS. For example, when flying in intercontinental airspace (i.e., over land) the airplane IHS may connect to land-based network connection towers or other land-based network connection devices through an air-to-ground (A2G) access network, while when flying over the ocean or remote landmasses, the airplane IHS may connect to a satellite network connection device. Similarly as above, if the airplane IHS is not within connection range or otherwise cannot connect (e.g., due to weather or interference) with a stable network connection device (land-based or satellite), network connectivity is not provided and users on the plane must wait until the airplane IHS is within connection range of a stable network connection device to access the network.

Accordingly, it would be desirable to provide an improved networked system.

SUMMARY

According to one embodiment, a method for providing a dynamic node network includes providing a requesting mobile IHS that is moving relative to a land mass; providing an assisting mobile IHS that is moving relative to the land mass and the requesting mobile IHS; providing a first provisioning mobile IHS that is moving relative to the land mass, the requesting mobile IHS, and the assisting mobile IHS, wherein the first provisioning mobile IHS has direct access to a network element that is not directly accessible by the requesting mobile IHS; receiving a request to access the network element from the requesting mobile IHS through the assisting mobile IHS by the first provisioning mobile IHS; and providing access to the network element for the requesting mobile IHS through the assisting mobile IHS using the first provisioning mobile IHS.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
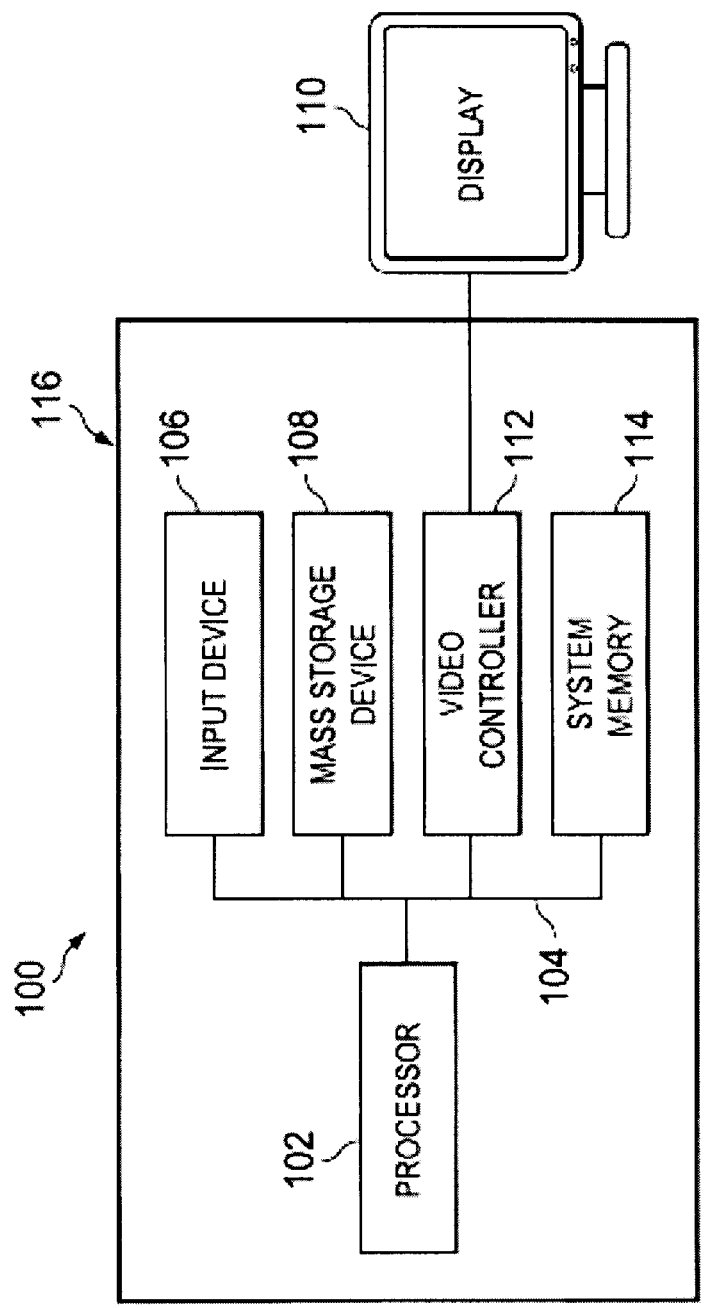
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
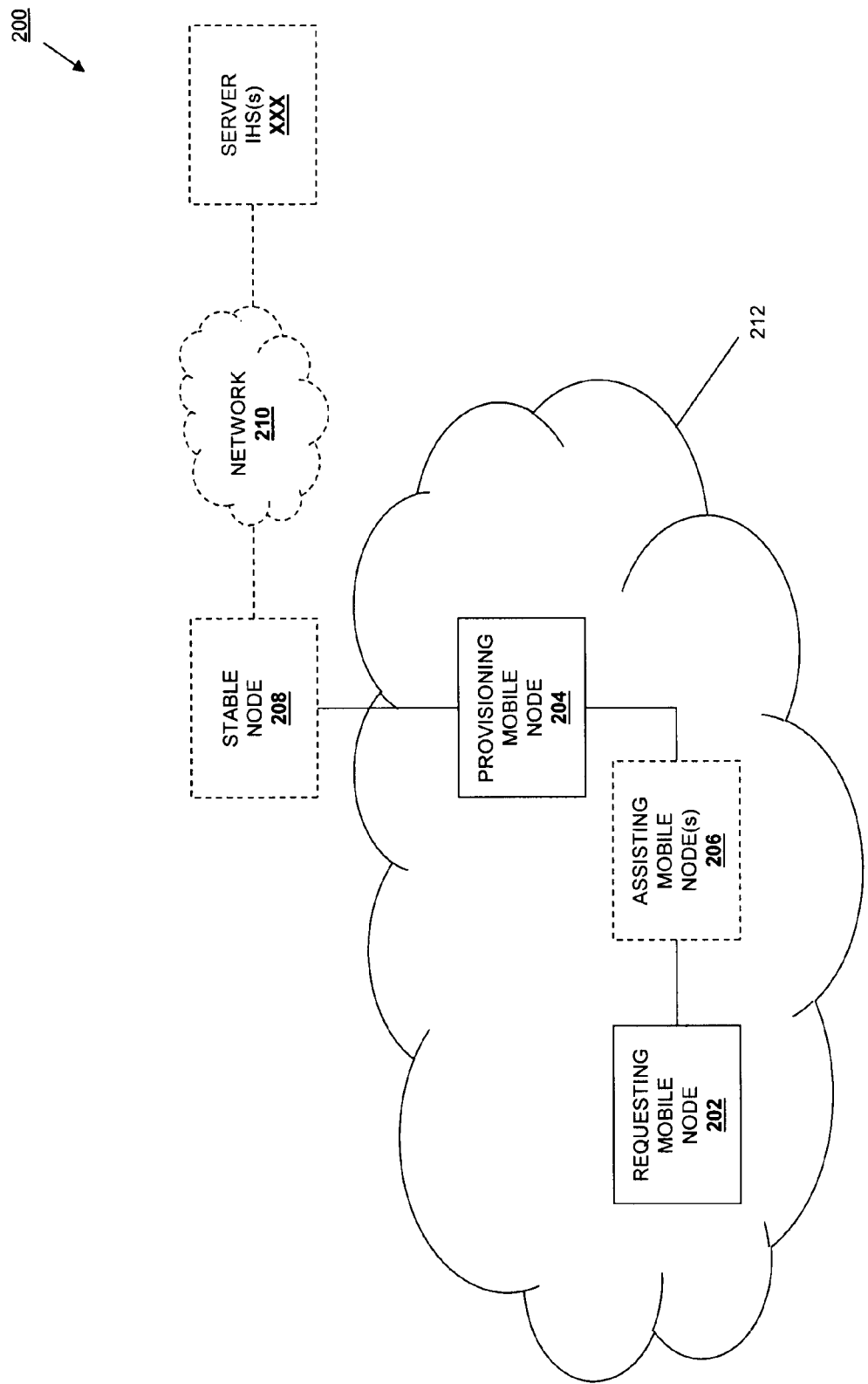
FIG. 2 is a schematic view illustrating an embodiment of a dynamic node networked system.

Referring now to FIG. 2, an embodiment of a dynamic node networked system 200 is illustrated. As discussed below, elements of the dynamic node networked system 200 may be optional depending on the embodiment being implemented, and those optional elements are indicated by dashed lines. The dynamic node networked system 200 includes mobile nodes that include combinations of hardware and software that allow the mobile nodes to communicate with each other in the dynamic node networked system 200, as discussed below. For example, mobile nodes may include a IHS that may include some or all of the IHS components of the IHS 100 discussed above with reference to FIG. 1, and/or other mobile devices known in the art. As described in several embodiments discussed below, a requesting mobile node 202 is "mobile" in that it moves relative to a land mass (i.e., the Earth). In some embodiments discussed below, the requesting mobile node 202 is a mobile IHS or device that is requesting content that is not stored on the requesting mobile node 202, but rather is stored on another mobile node in the dynamic node networked system 200, while in other embodiments, the requesting mobile node 202 is a "remote" mobile node that is not directly connected to any stable node that can provide connectivity to a desired network (e.g., the Internet) and is requesting a connection to at least one stable node that can provide that network connectivity. In an embodiment, content may include any data structure requested by a requesting mobile node including, but not limited to, computer applications or other computer files (e.g., audio files, video files, etc.), compressed files, and/or a variety of other data structures known in the art.

The requesting mobile node 202 is coupled to a provisioning mobile node 204, either directly or in some embodiments through one or more assisting mobile nodes 206. As described in several embodiments discussed below, the provisioning mobile node 204 is "mobile" in that it moves relative to the land mass (i.e., the Earth) and the requesting mobile node 202, and the one or more assisting mobile nodes 206 are "mobile" in that they move relative to the land mass (i.e., the Earth), the requesting mobile node 202, and the provisioning mobile node 204. Thus, in some embodiments, the dynamic node networked system 200 includes a requesting mobile node 202, a provisioning mobile node 204, and in some cases one or more assisting mobile nodes 206 all moving relative to a land mass (i.e., Earth) and each other. In some embodiments discussed below, the one or more assisting mobile nodes 206 are mobile IHSs or devices that do not store content requested by the requesting mobile node 202 but that can provide a connection between the requesting mobile node 202 and the provisioning mobile node 204 when the requesting mobile node 202 cannot directly connect to the provisioning mobile node 204. In other embodiments, the one or more assisting mobile nodes 206 are "remote" mobile node that are not directly connected to any stable node that can provide connection to a desired network but that can provide a connection between the requesting mobile node 202 and the provisioning mobile node 204 when the requesting mobile node 202 cannot directly connect to the provisioning mobile node 204 and is requesting a connection to at least one stable node that the provisioning mobile node 204 is directly connected to. In some embodiments discussed below, the provisioning mobile node 204 is a mobile IHS or device that stores content (e.g., on a storage device such as, for example, the storage device 108 discussed above with reference to FIG. 1) that is not stored on the requesting mobile node 202, while in other embodiments, the provisioning mobile node 204 is a "connected" mobile node that is directly connected to a stable node that can provide connectivity to a desired network (e.g., the Internet).

As discussed above, in some embodiments the provisioning mobile node 204 is directly connected to a stable node 208 such that communication between the provisioning mobile node 204 and the stable node 208 is accomplished without any intermediary devices. For example, the direct connection between the provisioning mobile node 204 and the stable node 208 may include direct, wireless communications between the provisioning mobile node 204 and the stable node 208 without passing through any other mobile nodes or stable nodes. The stable node 208 is "stable" relative to the mobile nodes 202, 204, and in some embodiments, 206. In some embodiments, the stable node 208 may be mounted, secured, or otherwise not moving relative to the land mass (i.e., Earth) while the mobile nodes 202, 204, and in some embodiments, 206 move relative to the land mass (i.e., Earth) and each other. For example, the stable node 208 may be a cellular tower, a wireless router, a local area network switch, and/or a variety of other devices that are not moving relative to a land mass. In other embodiments, the stable node 208 may be positioned far enough away from the land mass (i.e., Earth) such that while the stable node 208 may move relative to the land mass, it is considered stable with respect to the mobile nodes 202, 204, and in some embodiments, 206 as they move relative to the land mass (i.e., Earth) and each other. For example, the stable node 208 may be a satellite communications device that orbits the Earth a great distance from any land mass and that is not considered to be a mobile node in the dynamic node network.

In embodiments including the stable node 208, the stable node 208 is connected to a network 210 other than a dynamic node network 212 provided between the mobile nodes, discussed below. For example, the stable node 208 may be a cellular tower, a wireless router, and/or other device that is connected to the network 210 which may be, for example, a Local Area Network (LAN), the Internet, and/or a variety of other networks known in the art. The network 210 may be connected to one or more IHSs such as, for example, the server IHSs 214 illustrated in FIG. 2, that may include applications, computer files, and/or any other data structure known in the art that is retrievable over a network.

Figure 3:
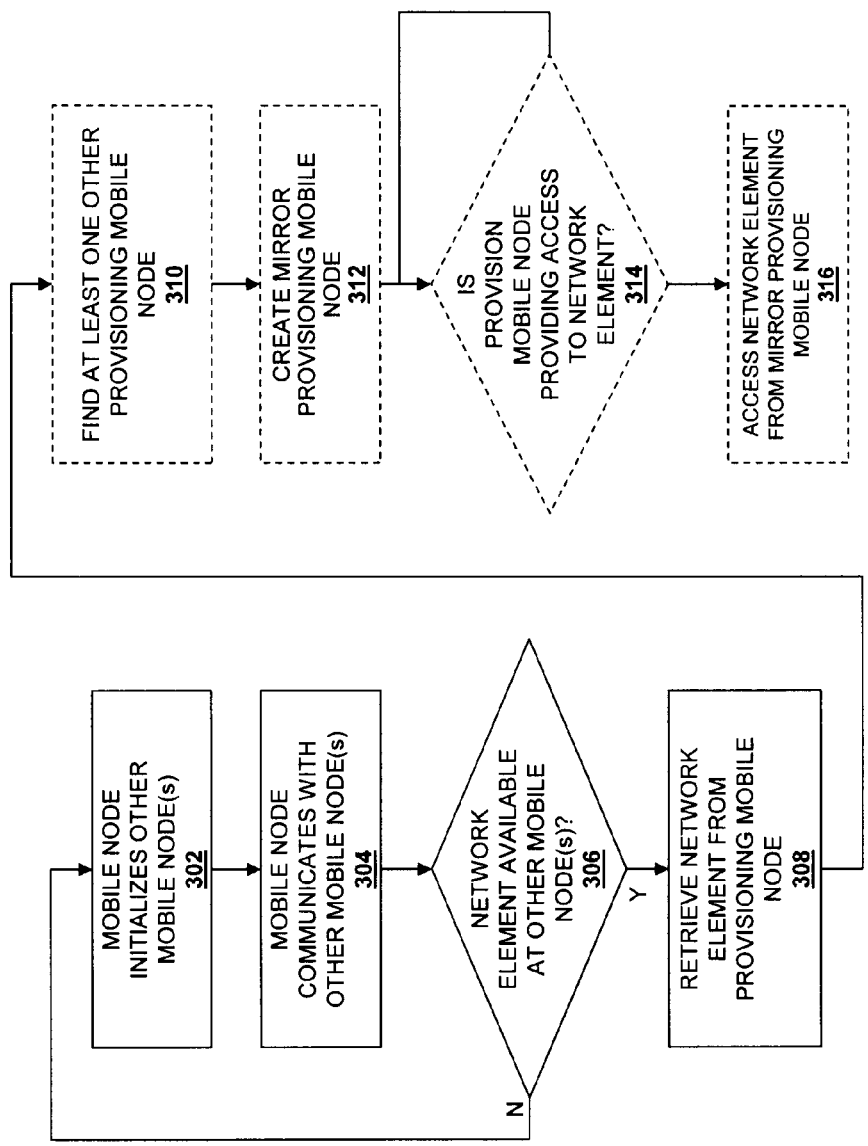
FIG. 3 is a flow chart illustrating an embodiment of a method for providing a dynamic node network.

Referring now to FIGS. 2 and 3, a method 300 for providing a dynamic node network is illustrated. The method 300 begins at block 302 where a requesting mobile node initializes to other mobile node(s). In some embodiments of the method 300, the requesting mobile node 202 may be utilized by a user of the system 200 to request content that is not stored on the requesting mobile node 202, while in other embodiments of the method 300, the requesting mobile node 202 may be utilized by a user of the system 200 to request connection to the network 210 that is not directly connected to the requesting mobile node 202. The initialization with the other mobile node(s) at block 302 may include the requesting mobile node 202 determining that other mobile node(s) is/are within a minimum communication distance of the requesting mobile node 202 that is necessary to transmit and receive data between the requesting mobile node 202 and the other mobile node(s) and, in response, sending an initialization message to the other mobile node(s) that include information necessary for the other mobile node(s) to respond to the requesting mobile node 202. In an embodiment, the requesting mobile node 202 may use a "neighborhood" search method to find other mobile nodes, which includes determining the communication signal strength of the requesting mobile node 202, determining the distance that the communication signal strength will allow the communication signal to travel, and searching within that distance for the other mobile nodes. In an embodiment such as, for example, a remote environment or a high interference environment (e.g., and area where electromagnetic noise is prominent), the requesting mobile node 202 may not be able to find any other mobile nodes to initialize with and, in response, the requesting mobile node 202 may initialize to a predefined initialization state that causes the requesting mobile node to continually search for other mobile nodes to initialize with. In some embodiments, in response to receiving an initialization message, the other mobile node(s) may reply with any information necessary to allow communications between the requesting mobile node 202 and the other mobile node(s).

The method 300 then proceeds to block 304 where the requesting mobile node communicates with the other mobile node(s) that were initialized with at block 302. In an embodiment, the requesting mobile node 202 communicates with the other mobile node(s) to communicate information about the network element (e.g., content, network access, and/or a variety of other network elements known in the art) that the requesting mobile node 202 is requesting. For example, the requesting mobile node 202 may communicate to the other mobile node(s) details about content that the requesting mobile node 202 would like to retrieve and that is not stored on the requesting mobile node 202. In another example, the requesting mobile node 202 may communicate details to the other mobile node(s) about the network 210 that the requesting mobile node 202 would like to access but that is not directly accessible by the requesting mobile node 202. In embodiment, details communicated about content between the requesting mobile node 202 and the other mobile node(s) may include any information needed to retrieve the desired content. In an embodiment, details communicated about the network 210 between the requesting mobile node 202 and the other mobile node(s) may include any information needed to access the desired network.

The method 300 then proceeds to decision block 306 where it is determined whether the network element is available at the other mobile node(s). In response to the communications at block 304, the other mobile node(s) may determine, and the requesting mobile node 202 may be informed, that the network element being requested by the requesting mobile node 202 is not available on the other mobile node(s) initialized with at block 302 and communicated with at block 304. In an embodiment, the other mobile node(s) may not store the content requested by the requesting mobile node 202, may not have a direct connection to the stable node 208 that provides access to the network 210 that is requested by the requesting mobile node 202, and/or otherwise may not be able to provide access to the network element for the requesting mobile node. In such an embodiment, the other mobile node(s) are assisting mobile node(s) 206 that cannot immediately make the requested network element available to the requesting mobile node 202, and the method 300 then proceeds back to blocks 302 and 304 and decision block 308. However, after the requesting mobile node 202 has connected with an assisting mobile node(s) 206 in a first loop through blocks 302 and 304 and decision block 306 of the method 300, the second loop through blocks 302 and 304 and decision block 306 of the method 300 may be performed by each those assisting mobile node(s) 206 to connect to other mobile nodes and determine whether they have access to the requested network element. Thus, the operations of each of the assisting mode(s) 206 during blocks 302 and 304 and decision block 306 and other mobile nodes that are within a minimum communication distance of those respective assisting mobile node(s) 206 is substantially similar as discussed above for the operations between the requesting mobile node 202 and the other mobile node(s) during the first pass through blocks 302 and 304 and decision block 306 of the method 300.

In response to the communications at block 304, the other mobile node(s) may determine, and the requesting mobile node 202 (or assisting mobile node 206 in second or subsequent loops through blocks 302 and 304 and decision block 306) may be informed, that the network element being requested by the requesting mobile node 202 (or assisting mobile node 206) is available on the other mobile node(s) at decision block 306. In an embodiment, the other mobile node(s) may either store the content requested by the requesting mobile node 202 (or assisting mobile node 206), or the other mobile node(s) may have a direct connection to the stable node 208 that provides access to the network 210 that is requested by the requesting mobile node 202 (or assisting mobile node 206). In such an embodiment, the other mobile node(s) are provisioning mobile node(s) 204 that can make the requested network element immediately available to the requesting mobile node 202 (either directly or through the assisting mobile node(s) 206 to which the requesting mobile node 202 was connected in one or more previous performances of blocks 302 and 304 and decision block 306 of the method 300), and the method 300 then proceeds to block 308. In an embodiment where there are multiple provisioning mobile nodes available, the requesting mobile node may select the mobile node connections that are closest (i.e., the shortest distance path from the requesting mobile node to the provisioning mobile node), the mobile node connections providing the highest communications speed, the mobile node connections providing the strongest signal strength, and/or using a variety of other communications transmission criteria known in the art.

Thus, the dynamic node network 212 may be created using blocks 302 and 304 and decision block 306 of the method 300, either by a single pass through the blocks 302 and 304 and decision block 306, or by looping through blocks 302 and 304 and decision block 306 multiple times. For example, the requesting mobile node 202 may initiate and communicate with a provisioning mobile node 204 on the first pass through blocks 302 and 304 and decision block 306, and thus the dynamic node network 212 will be created that includes the requesting mobile node 202 connected the provisioning mobile node 204 and the method 300 will proceed to block 308. In another example, the requesting mobile node 202 may initiate and communicate with assisting mobile nodes 206 on the first pass through blocks 302 and 304 and decision block 306, and those assisting mobile nodes 206 may then initiate and communicate with other assisting mobile nodes 206 or the provisioning mobile node 204 on the second or subsequent passes through blocks 302 and 304 and decision block 306, and thus the dynamic node network 212 will be created that includes the requesting mobile node 202 connected the provisioning mobile node 204 through one or more layers of assisting mobile nodes 206, with the method 300 proceeding to block 308 once the provisioning mobile node 204 has been found.

As discussed above, the method 300 proceeds to block 308 when the requesting mobile node connects to the provisioning mobile node 204 (i.e., a mobile node is found that has the requested network element available), either directly or through one or more assisting mobile nodes 206. At block 308, the network element is retrieved from the provisioning mobile node. Thus, in some embodiments, the network element may be retrieved from the provisioning mobile node 204 by the requesting mobile node 202 through the direct connection between them. For example, the network element may be content stored on the provisioning mobile node 204 and not on the requesting mobile node 202, and at block 308 that content may be transmitted from the provisioning mobile node 204 and/or retrieved by the requesting mobile node 202 through the direct connection between them. In another example, the network element may be access to the network 210 through the stable node 208 directly connected to the provisioning mobile node 204 but not directly connected to the requesting mobile node 202, and at block 308 access to the network 210 via the stable node 208 may be provided for the requesting mobile node 202 through the provisioning mobile node 204. Furthermore, in some embodiments, the network element may be retrieved from the provisioning mobile node 204 by the requesting mobile node 202 through one or more connections provided by one or more assisting mobile nodes 206. For example, the network element may be content stored on the provisioning mobile node 204 and not on the requesting mobile node 202 or any of the assisting mobile nodes 206, and at block 308 that content may be transmitted from the provisioning mobile node 204 and/or retrieved by the requesting mobile node 202 via the assisting mobile node(s) 206 and the connection(s) between them, the provisioning mobile node 204, and the requesting mobile node 202. In another example, the network element may be access to the network 210 through the stable node 208 directly connected to the provisioning mobile node 204 but not to the requesting mobile node 202 or any of the assisting mobile nodes 206, and at block 308 access to the network 210 via the stable node 208 may be provided for the requesting mobile node 202 through the provisioning mobile node 204 and the assisting mobile nodes 206.

Thus, a system and method are provided that creates a dynamic node network including a plurality of mobile nodes that provide mobile nodes that do not have direct access to desired network elements (e.g., the content or network access discussed above) connections to mobile nodes that have direct access to those desired network elements. One of skill in the art will recognize that the system and method described above may be performed to provide a dynamic cloud network that provides for the exchange of a data between a plurality of mobile IHSs. For example, as discussed above, requesting mobile nodes may connect to provisioning mobile nodes through assisting mobile nodes that do not have direct access to content requested by the requesting mobile nodes. In some embodiments, assisting mobile nodes may retrieve a copy of the content and then become provisioning mobile nodes for the requesting mobile node. Similarly, once a requesting mobile node accesses content from a provisioning mobile node, that content may be copied to the requesting mobile node such that the requesting mobile node may later become a provisioning mobile node for the same content. Furthermore, one of skill in the art will recognize that the method 300 may be performed simultaneously by plurality of mobile nodes such that a plurality of requesting mobile nodes can access one or more desired network elements. Further still, requesting mobile nodes and assisting mobile nodes may simultaneously be provisioning mobile nodes (e.g., for content stored on those mobile nodes that is requested by another mobile node.)

In an embodiment, the mobile nodes and their connections in the dynamic node network 212 may be used to create a dynamic map that includes details of the network elements such as information about the content (e.g., quality, location, etc), information about the network access (e.g., quality, locations of network access, etc.), and/or information about the mobile node themselves. For example, information may be exchanged between each of the mobile nodes in the dynamic node network 212 and sent to the requesting mobile node so that requesting mobile node may map connections, content, network access, mobile node activity, and/or a variety of other information about the dynamic node network 212. That map may be used by the requesting mobile node to optimize the retrieval of content or optimize the access to a network. In addition, the map may be displayed to a user on their device so that the user can manipulate how content or network access is retrieved in the dynamic node network 212, to determine the activity of the mobile nodes (e.g., their movement, signal transmission ability, etc) to determine the state of the network or even to determine real-world data such as the local flow of traffic (e.g., automobile traffic, human traffic, etc.) as indicated by the movement of the mobile nodes in the dynamic node network 212.

Because each of the mobile nodes in the dynamic node network 212 are moving relative to each other (and a land mass, i.e., the Earth), assisting mobile nodes 206 and/or the provisioning mobile node 204 will very likely at some point move beyond the minimum communication distance from each other and/or the requesting mobile node 202, or in some embodiments, the provisioning mobile node 204 may move beyond a minimum communication distance from the stable node 208. In such a situation, the link provided by the dynamic node network 212 to make the network element available to the requesting mobile node 202 is broken and the requesting mobile node 202 no longer has access to that network element. In some embodiments, this loss of access to the network element may be remedied by using the method 300 to provide the requesting mobile node 202 with one or more redundant provisioning mobile nodes (referred to hereinafter as a "mirror provisioning nodes") that may be used to supplement the provision of the network element to the requesting mobile node 202, or to provide access to the network element if the original provisioning mobile node 204 becomes unavailable.

Thus, in some embodiments, the method 300 proceeds from block 308 to block 310 where at least one other provisioning mobile node is found. In an embodiment, block 310 may be carried out substantially as discussed above for blocks 302 and 304 and decision block 306 in order to connect the requesting mobile node 202 to additional provisioning mobile nodes that have access to the network element (i.e., the content not stored on the requesting mobile node 202 or a direct connection to the stable node 208 providing access to the network 210). In response to finding at least one other provisioning mobile node at block 310, the method 300 proceeds to block 312 where a mirror provisioning mobile node is created. In an embodiment, the creation of the mirror provisioning mobile node includes establishing and monitoring the connection or connections between the requesting mobile node 202 and the mirror provisioning mobile node 204 (and any assisting mobile nodes 206 if necessary). In some embodiments, the mirror provisioning mobile node may be used along with the provisioning mobile node 204 to provide access to the network element, while in other embodiments, the mirror provisioning mobile node may simply be monitored to confirm its connection to the requesting mobile node 202 is still available. Similarly as discussed above, in the case of content, assisting mobile nodes may copy content from mirror provisioning mobile nodes such that an assisting mobile node becomes a mirror provisioning mobile node. One of skill in the art will recognize that this may create mirror provisioning mobile nodes that are 'closer' to the requesting mobile node than the original provisioning mobile node, and in some cases, may result in "swapping" the mirror provisioning mobile node with the original provisioning mobile node to access the content.

The method 300 then proceeds to decision block 314 where it is determined whether the provisioning mobile node is providing access to the network element. If the provisioning mobile node 204 is providing access to the network element for the requesting mobile node 202 at decision block 314, the method 300 continues to monitor the access to the network element provided by the provisioning mobile node 204. If at decision block 314 it is determined that the provisioning mobile node 204 is no longer providing access to the network element for the requesting mobile node 202, the method 300 proceeds to block 316 where the network element is accessed from the mirror provisioning mobile node in substantially the same manner as discussed for the original provisioning mobile node 204.

Thus, the system and method may provide one or more redundant mirror provisioning mobile nodes in the dynamic node network to either assist in making the network element available to the requesting mobile node and/or to provide the network element to the requesting mobile node in the event the current provisioning mobile node becomes unavailable (or when the mirror provisioning node provides a stronger, faster, closer, or otherwise more desirable connection). One of skill in the art will recognize that the method 300 may be repeatedly performed to continually modify the dynamic node network 212 as mobile nodes turn off (e.g., mobile IHSs/devices power down), move out of range of the dynamic node network, and move within range of the dynamic node network. Therefore, the system and method of the present disclosure provide a dynamic node network whose mobile nodes and the connections between them may be constantly changing to provide a requesting mobile node access to a desired network element.

Figure 4A:
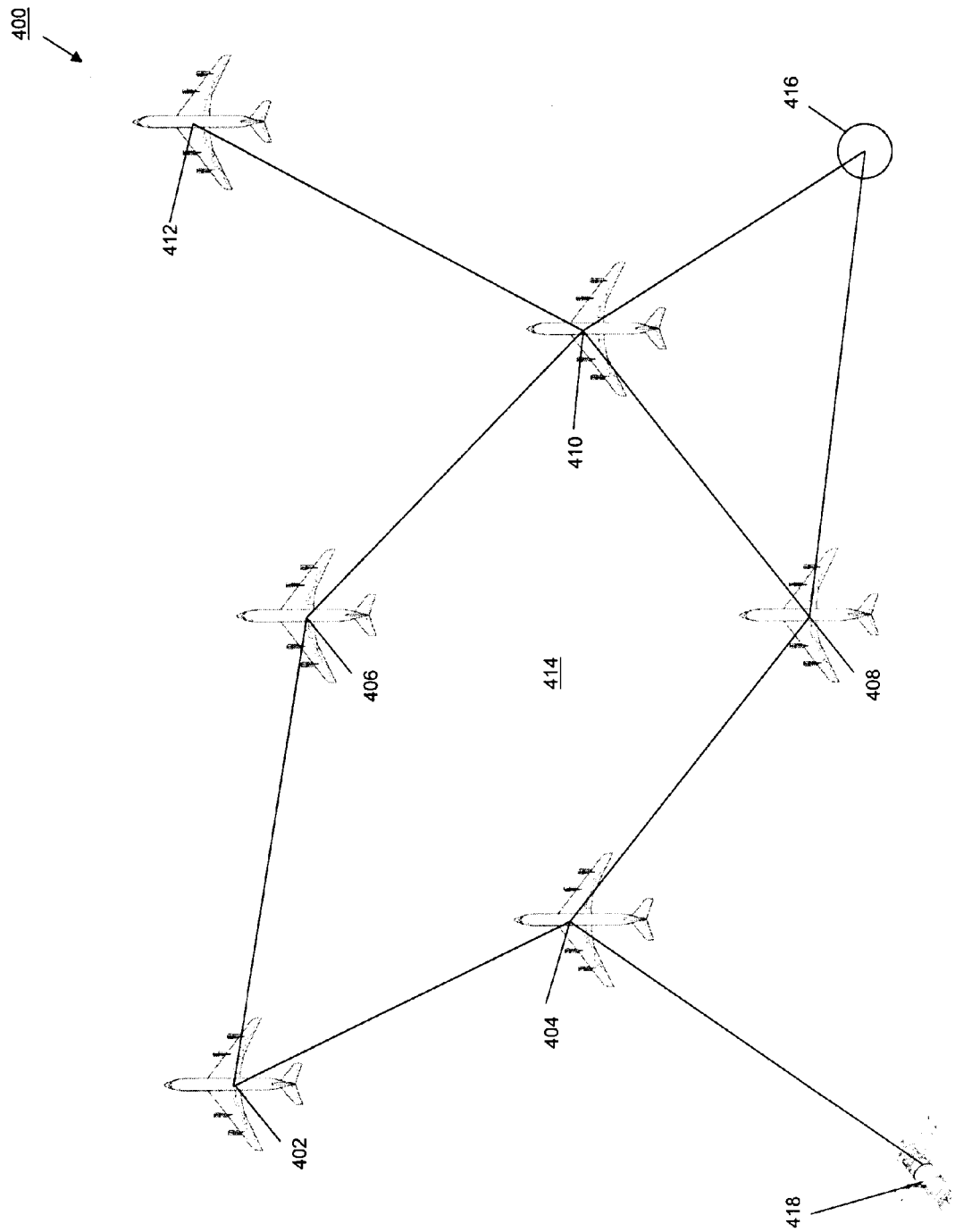
FIG. 4a is a schematic view illustrating an embodiment of a dynamic node network provided using airplanes.
Figure 4B:
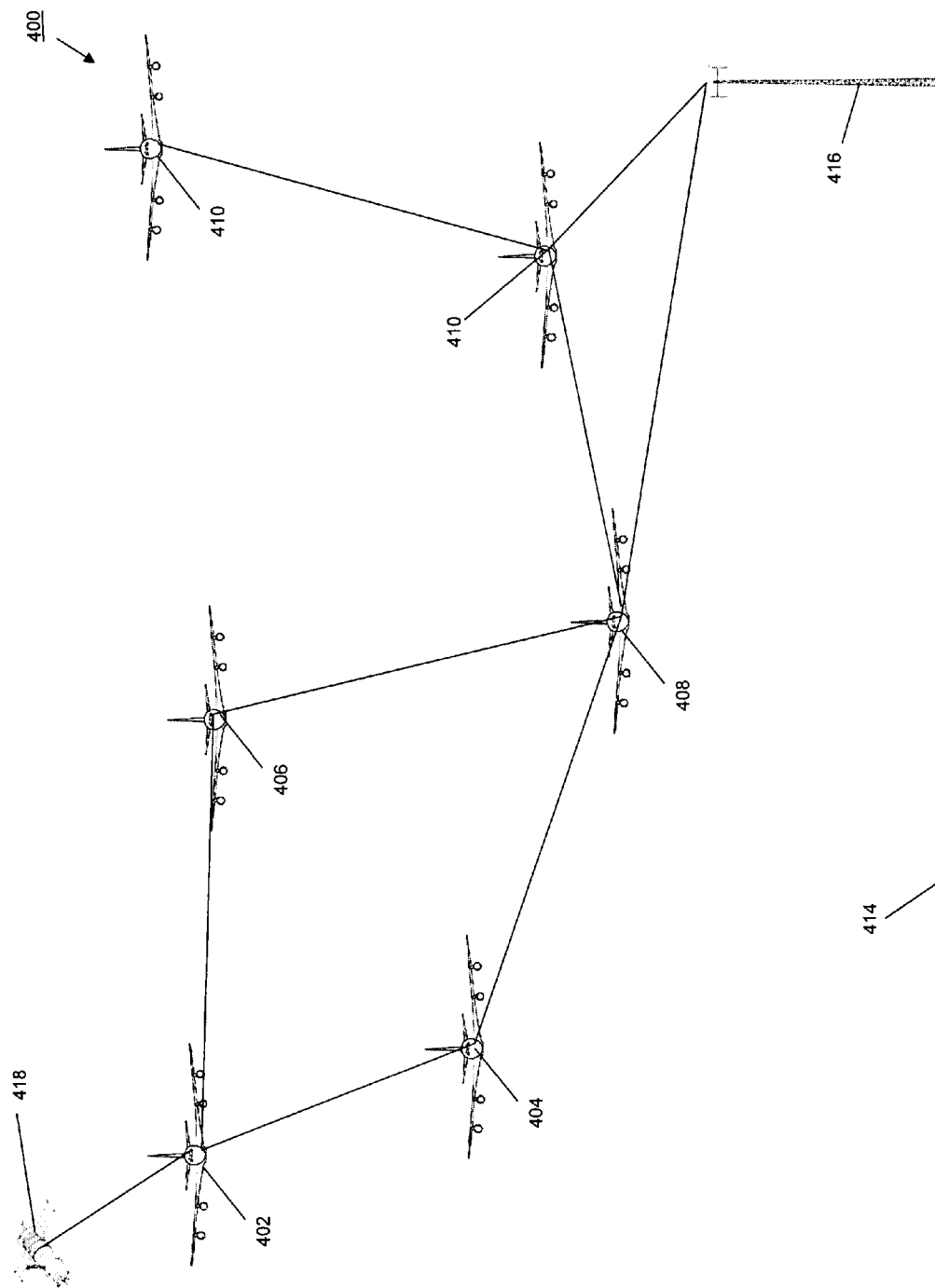
FIG. 4b is a schematic view illustrating an embodiment of a dynamic node network provided using airplanes.

Referring now to FIGS. 4a and 4b, an embodiment of a dynamic node networked system 400 is illustrated. The dynamic node networked system 400 has been created via the method 300 using IHSs such as, for example, server IHSs provided on respective airplanes 402, 404, 406, 408, 410, and 412. The airplanes 402, 404, 406, 408, 410, and 412 are moving relative to each other and a land mass 414 (i.e., the Earth). A communications tower 416 (e.g., a cellular tower) extends from the land mass 414, and a satellite 416 is in orbit and stable relative to the movement of the airplanes 402, 404, 406, 408, 410, and 412. It should be recognized that the airplanes 402, 404, 406, 408, 410, and 412 provide the mobile nodes discussed above that are connected together in the dynamic node network. As such, any of the airplanes 402, 404, 406, 408, 410, and 412 may provide requesting mobile nodes, assisting mobile nodes, and/or provisioning mobile nodes, depending on the content being requested and the content stored on their server IHSs, their connection to a stable node such as the communications tower 416 or satellite 418, and their ability to communicate with each other. As illustrated, the airplanes 408 and 410 are provisioning mobile nodes/connected mobile nodes for any network access provided through the communications tower 416, while the airplane 402 is a provisioning mobile node/connected mobile node for any network access provided through the satellite 418. In an embodiment, communications between the airplanes 402, 404, 406, 408, 410, and 412 (or more specifically, their server IHSs), may be accomplished using ultra wide radio band communications, millimeter wave communication, terahertz communication, visible light modulation communication, UV for long rang communication, and/or a variety of other communications technologies known in the art.

The networked system 400 is an example of how the dynamic node network may be provided through a 3-dimensional grid using a high density moving system such as air traffic. The networked system 400 including airplanes provides a valuable application of the teachings of the present disclosure. For example, in the United States, there are more than 4000 flights in the air at a given time, and using the systems and methods of the present disclosure, content and network services (e.g., the Internet) may be enabled for any given airplane in the system. Because any airplane in the system has access to the content stored on other airplanes in the system, the total amount of content available to any airplane in the system is greatly expanded (e.g., relative to conventional systems that are limited to the content stored on the IHS in the airplane.) Because in flight distances over highly populated areas (e.g., the southern region of the United States) are relatively close (e.g., less than a mile), the ~5-60 GHz communication band provides a technology to communicate between the airplanes and provide cloud data services between airplanes. In addition, parked as well as moving airplanes may be used as servers, mirrors, and reflectors in the dynamic node network. Issues such as cloud burst (i.e., when too many nodes attempt to access the same provisioning mobile node at the same time) may be managed with the mobile nodes in the gird or lattice topology discussed herein.

Figure 5:
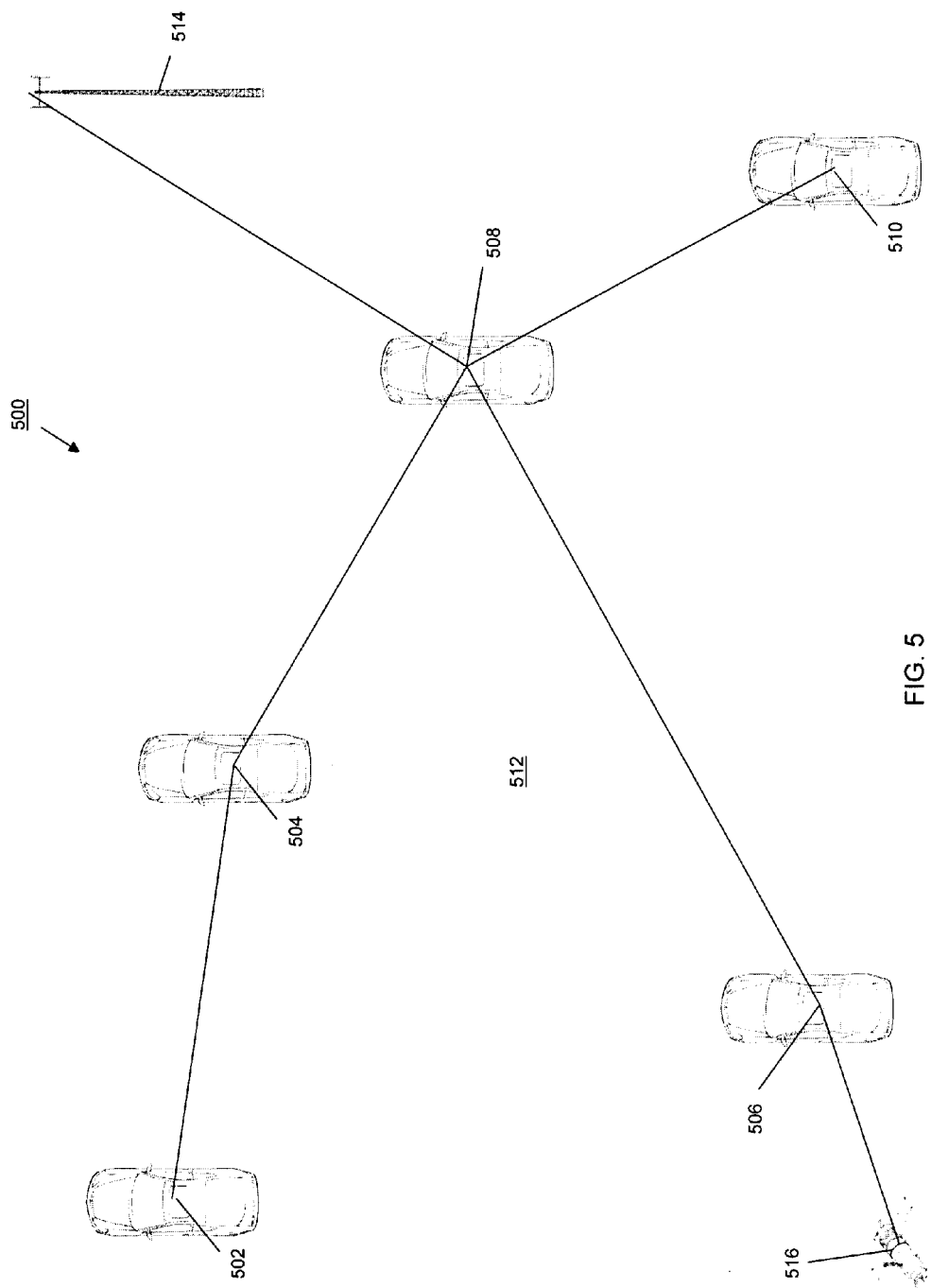
FIG. 5 is a schematic view illustrating an embodiment of a dynamic node network provided using automobiles.

Referring now to FIG. 5, an embodiment of a dynamic node networked system 500 is illustrated. The dynamic node networked system 500 has been created via the method 300 using IHSs such as, for example, server IHSs provided on respective automobiles 502, 504, 506, 508, and 510. The automobiles 502, 504, 506, 508, and 510 are moving relative to each other and a land mass 512 (i.e., the Earth). A communications tower 514 (e.g., a cellular tower) extends from the land mass 512, and a satellite 516 is stable relative to the automobiles 502, 504, 506, 508, and 510. It should be recognized that the automobiles 502, 504, 506, 508, and 510 provide the mobile nodes discussed above that are connected together in the dynamic node network. As such, any of the automobiles 502, 504, 506, 508, and 510 may provide requesting mobile nodes, assisting mobile nodes, and/or provisioning mobile nodes, depending on the content being requested and the content stored on their server IHSs, or based on their connection to a stable node such as the communications tower 514 or satellite 516. As illustrated, the automobile 508 is a provisioning mobile node/connected mobile node for any network access provided through the communications tower 514, while the automobile 506 is a provisioning mobile node/connected mobile node for any network access provided through the satellite 516. In an embodiment, communications between the automobiles 502, 504, 506, 508, and 510 (or more specifically, their server IHSs), may be accomplished using Global System for Mobile (GSM) communications, Ultra Wide Band (UWB communication, and/or a variety of other communications technologies known in the art. As discussed above, mapping of a dynamic node network including automobiles may be used to indicate the flow of automobile traffic as indicated by the movement of the mobile nodes in the dynamic node network.

Figure 6:
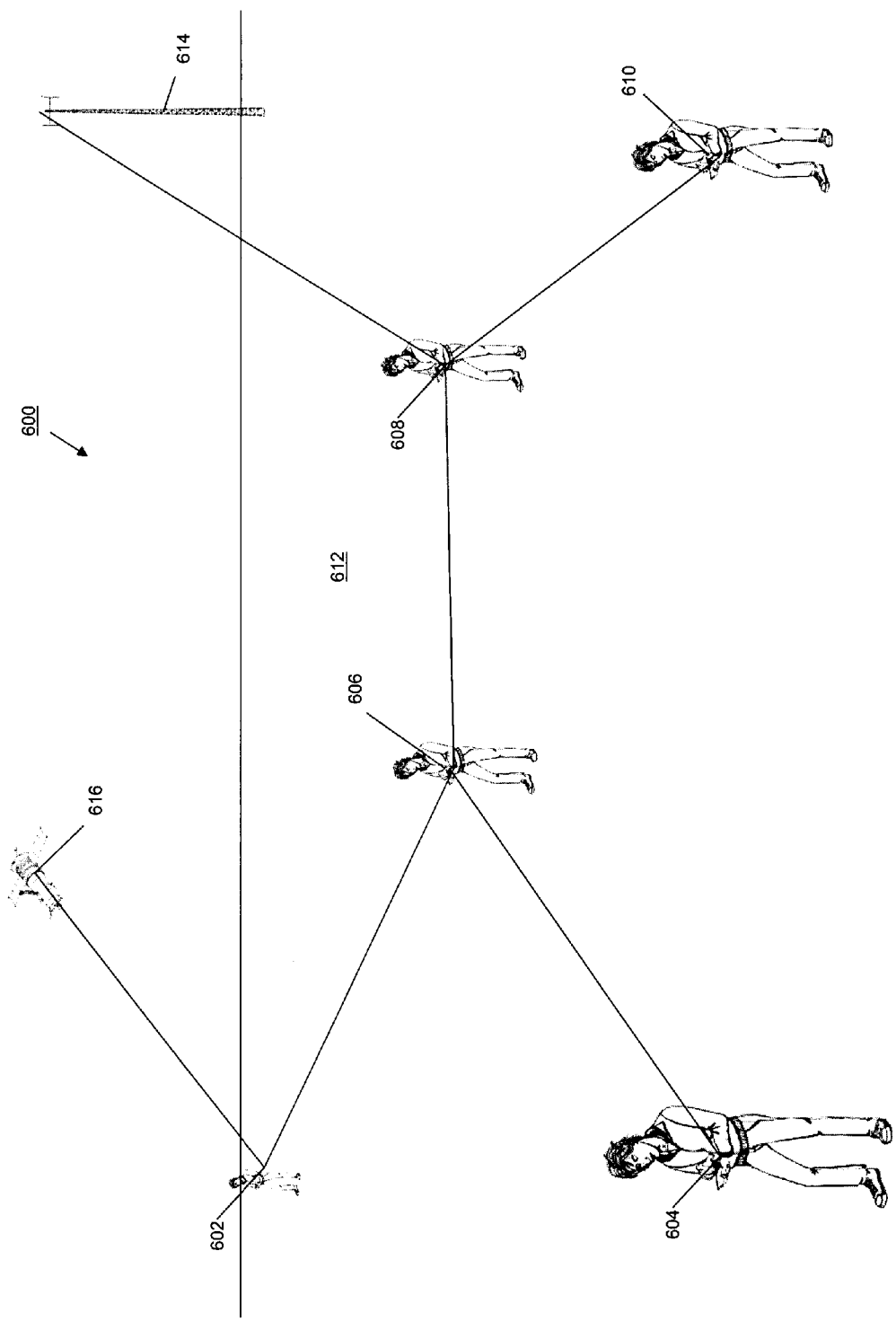
FIG. 6 is a schematic view illustrating an embodiment of a dynamic node network provided using people.

Referring now to FIG. 6 an embodiment of a dynamic node networked system 600 is illustrated. The dynamic node networked system 600 has been created via the method 300 using IHSs such as, for example, personal mobile IHSs (e.g., mobile phones) provided with respective people 602, 604, 606, 608, and 610. The people 602, 604, 606, 608, and 610 are moving relative to each other and a land mass 612 (i.e., the Earth). A communications tower 614 (e.g., a cellular tower) extends from the land mass 612, and a satellite 616 is stable relative to the people 602, 604, 606, 608, and 610. It should be recognized that the people 602, 604, 606, 608, and 610 provide the mobile nodes discussed above that are connected together in the dynamic node network. As such, any of the people 602, 604, 606, 608, and 610 may provide requesting mobile nodes, assisting mobile nodes, and/or provisioning mobile nodes, depending on the content being requested and the content stored on their personal mobile IHSs, or based on their connection to a stable node such as the communications tower 614 or satellite 616. As illustrated, the person 608 is a provisioning mobile node/connected mobile node for any network access provided through the communications tower 614, while the person 602 is a provisioning mobile node/connected mobile node for any network access provided through the satellite 616. In an embodiment, communications between the people 602, 604, 606, 608, and 610 (or more specifically, their personal mobile IHSs), may be accomplished using Global System for Mobile (GSM) communications, UWB communication, visible light communication, UV communication, and/or a variety of other communications technologies known in the art. As discussed above, mapping of a dynamic node network including automobiles may be used to indicate the flow of automobile traffic as indicated by the movement of the mobile nodes in the dynamic node network.

While the three examples of networked systems 400, 500, and 600 in FIGS. 4, 5, and 6, respectively, include solely airplanes, cars, and people, respectively, along with respective IHSs to provide the mobile nodes in the dynamic node network, one of skill in the art will recognize that a dynamic node network created and maintained according to the teachings of the present disclosure may include any combinations of the airplanes, cars, and people as disclosed herein, along with or being made up of moving objects with IHSs such as, for example, boats, trains, and/or a variety of other moving objects known in the art. One of skill in the art will recognize several benefits of such a mixed node dynamic network, including but not limited to energy savings for some of the mobile nodes in the system. For example, a personal mobile device operated by a person may conserve energy by connecting to an IHS in a car or plane and having that IHS (which likely has a much larger power source than the personal mobile device) perform any processing (e.g., involving content or network access) that would otherwise consume a relatively large amount of the power supply of the personal mobile device.

Figure 7A:
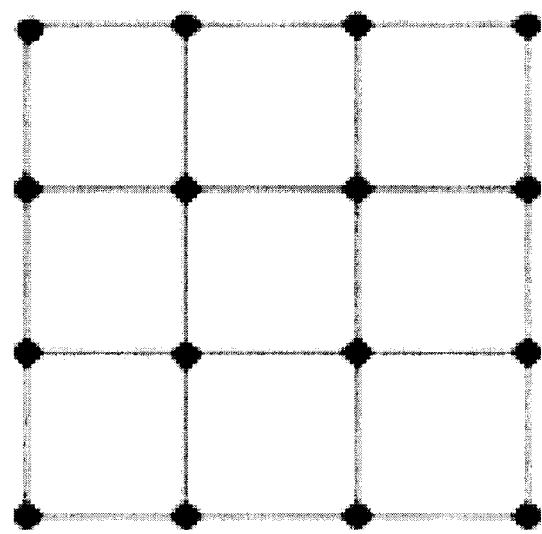
FIG. 7a is a schematic view illustrating an embodiment of a planar network type.
Figure 7B:
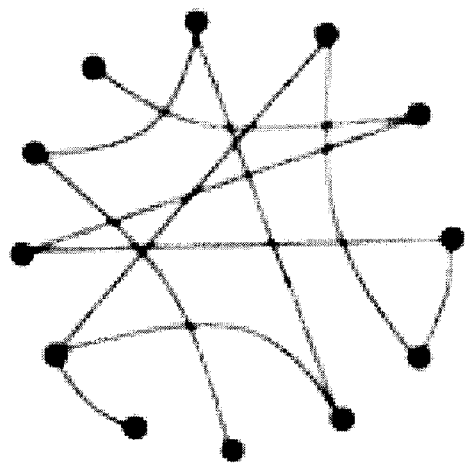
FIG. 7b is a schematic view illustrating an embodiment of a random network type.
Figure 7C:
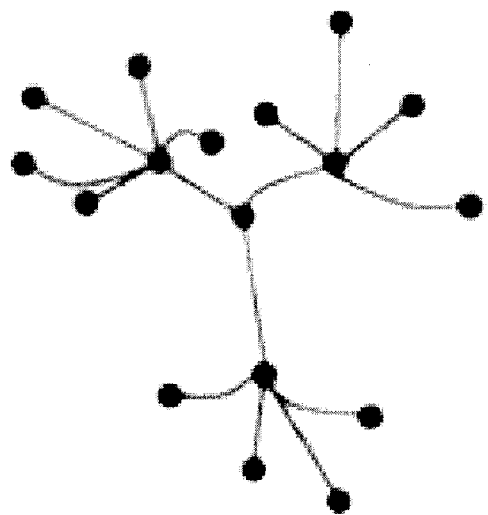
FIG. 7c is a schematic view illustrating an embodiment of a scale free network type.
Figure 7D:
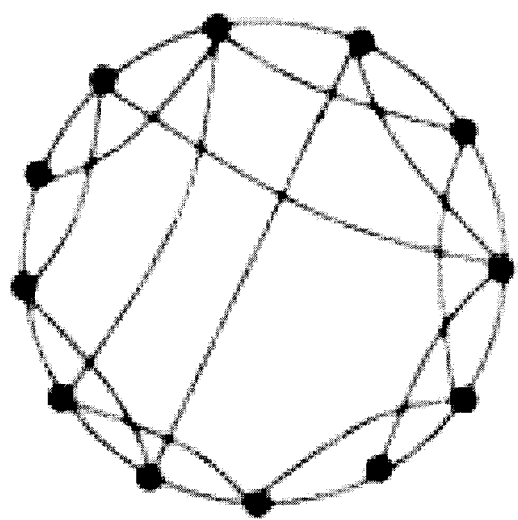
FIG. 7d is a schematic view illustrating an embodiment of a small world network type.

Referring now to FIGS. 7a, 7b, 7c, and 7d, a plurality of dynamic node network types are illustrated. FIG. 7a illustrates a planar network type 700, with each of the mobile nodes represented by a dot and the connections between the mobile nodes represented by lines. FIG. 7b illustrates a random network type 702, with each of the mobile nodes represented by a dot and the connections between the mobile nodes represented by lines. FIG. 7c illustrates a scale free network type 704, with each of the mobile nodes represented by a dot and the connections between the mobile nodes represented by lines. FIG. 7d illustrates a small world network type 706, with each of the mobile nodes represented by a dot and the connections between the mobile nodes represented by lines. It has been found, through the analysis of flight path data, that for a dynamic node network provided using the airplanes, such as that illustrated in FIGS. 4a and 4b, the random network type 702 and the small world network type 706 provide better adaptability to a dynamic cloud with the possibility of cloud burst.

Figure 8:
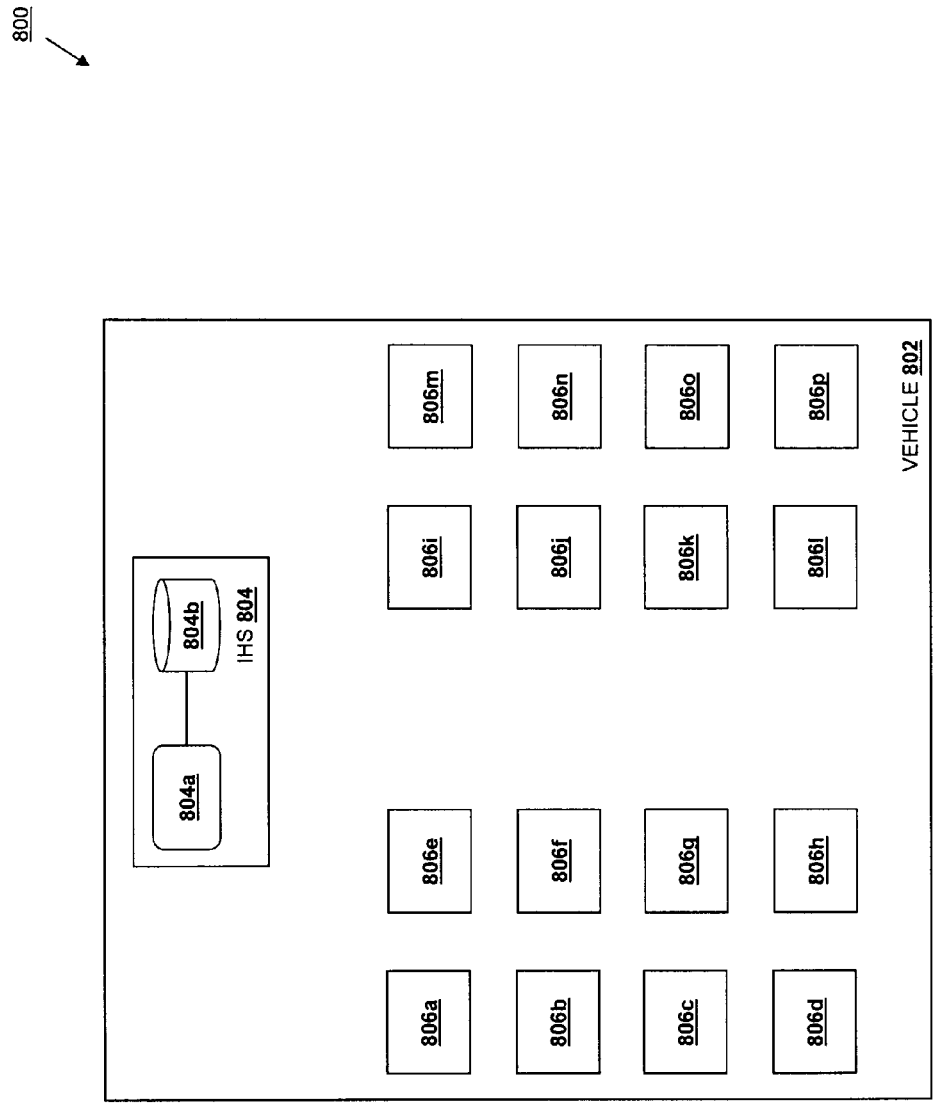
FIG. 8 is a schematic view illustrating an embodiment of a mobile node.

Referring now to FIG. 8, an embodiment of a mobile node 800 is illustrated that is provided by a vehicle 802 including an IHS 804. As discussed above, the vehicle 802 may be an airplane, a bus, a train, a boat, and/or a variety of other multi-passenger vehicles known in the art. The IHS 804 may be a server IHS and includes a processing system 804a coupled to a storage system 804b. The processing system 804a may include a processor, memory with processor executable instructions, and/or a variety of other IHS components that allow the IHS 804 to perform the functions of any of the mobile nodes discussed above, including but not limited to communicating with other mobile nodes and communicating with stable nodes. The storage system 804b includes storage devices known in the art that may store or be loaded with content. A plurality of passengers are located on the vehicle 802 and may each include a respective passenger IHS 806a-p, as illustrated. In some embodiments, 60 Ghz communications may be used for communications between the passenger IHSs 806a-p while 5-30 Ghz communications may be used for communications between mobile nodes within the dynamic node network.

As discussed above, the IHS 804 may be operated to according to the method 300 to access content on another mobile node or access a network through another mobile node. Once the content or network has been accessed, any of the passenger IHSs 806a-p may then access that content or network through the server IHS 804 using methods known in the art. Each passenger IHS 806a-p may become an access point for content or network access for another IHS 806a-p. As such, some passenger IHSs 806a-p may act as sinks (content/network access consumers), while other passenger IHSs 806a-p may act as providers (content/network access providers). In some embodiments, any passenger IHS 806a-p may control access for other passenger IHSs 806a-p to the content or network (e.g., a parent using a passenger IHS may control access to the content or network for their children using passenger IHSs.) The IHS 804 may provide content to passenger IHSs 806a-p and/or other IHSs provided by other mobile nodes using a time delayed continuous feedback (e.g., first IHS requesting the content receives the content) to remedy cloud burst, and/or handling high traffic or data requests using a dynamic burst partition (e.g., data is provided to the closest IHSs.) In an embodiment passenger IHSs may communicate using technologies such as, for example, Bluetooth, low power Bluetooth, 20 gigahertz, wireless LAN (e.g., IEEE802.11, HyperLAN, etc.), Home radio frequency (RF) or high frequency (HF), and/or a variety of other short range communication technologies known in the art.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A dynamic node networked system, comprising:
a plurality of mobile devices that are moving relative to a land mass, wherein a first remote mobile device of the plurality of mobile devices does not have a direct connection to at least one stable device that provides a connection to the Internet; and
at least one second remote mobile device of the plurality of mobile devices that is moving relative to the first remote mobile node, wherein the at least one second remote mobile node does not have a direct connection to that at least one stable device that provides a connection to the Internet; and
a first connected mobile device of the plurality of mobile devices that is moving relative to the first remote mobile device and the at least one second remote mobile device, wherein the first connected mobile device has a direct connection to the at least one stable device that provides the connection to the Internet;
wherein the first connected mobile device is configured to:
receive a request to access the Internet from the first remote mobile device through the at least one second remote mobile device; and
provide a first network access connection for the first remote mobile device through the at least one second remote mobile device to the at least one stable device such that the first remote mobile device can access the Internet; and
wherein the first remote mobile device is configured to:
receive network access information from each of the first connected mobile device and the at least one second remote mobile device;
use the network access information to generate and display a dynamic network access map that provides details about the first network access connection provided by each of the first connected mobile device and the at least one second remote mobile device; and
request a second network access connection through the first connected mobile device and the at least one second remote mobile device to the at least one stable device such that the first remote mobile device can access the Internet, wherein the second network access connection is different than the first network access connection and is requested in direct response to network access manipulation instructions received from a user by the first remote mobile device subsequent to displaying the dynamic network access map.

2. The networked system of claim 1,
wherein the at least one second remote mobile device includes a plurality of second remote mobile devices.

3. The networked system of claim 1, wherein the first remote mobile device is configured to:
find a second connected mobile device of the plurality of mobile devices that is moving relative to the land mass and the first remote mobile device, wherein the second connected mobile device has a direct connection to the at least one stable device that provides the connection to the Internet.

4. The networked system of claim 3, wherein the first remote mobile device is configured to:
determine that the connection to the at least one stable device through the first connected mobile device is unavailable and, in response, connect to the second connected mobile device to access the Internet through the second connected mobile device.

5. The networked system of claim 3, wherein the first remote mobile device is configured to:
access the Internet through both the first connected mobile device and the second connected mobile device.

6. The networked system of claim 1, wherein the plurality of mobile devices are provided in respective airplanes and ultra wide radio band communications are used to receive the request from the first remote mobile device and to provide the connection for the first remote mobile device to the at least one stable device.

7. The networked system of claim 1, wherein the plurality of mobile devices are provided in respective automobiles and Global System for Mobile (GSM) communications are used to receive the request from the first remote mobile device and to provide the connection for the first remote mobile device to the at least one stable device.

8. An information handling system (IHS) dynamic network, comprising:
a requesting mobile IHS that is moving relative to a land mass;
at least one assisting mobile IHS that is moving relative to the land mass and the requesting mobile IHS; and
a first provisioning mobile IHS that is moving relative to the land mass, the requesting mobile IHS, and the at least one assisting mobile IHS, wherein the first provisioning mobile IHS includes a storage storing content that is not stored on the requesting mobile IHS, and wherein the first provisioning mobile IHS is configured to:
receive a request for the content through the at least one assisting mobile IHS from the requesting mobile IHS; and
provide a first content retrieval connection to the requesting mobile IHS through the at least one assisting mobile IHS such that the requesting mobile IHS can access the content; and
wherein the requesting mobile IHS is configured to:
receive content retrieval information from each of the first provisioning mobile IHS and the at least one assisting mobile IHS;
use the content retrieval information to generate and display a dynamic content retrieval map that provides details about the first content retrieval connection provided by each of the first provisioning mobile IHS and the at least one assisting mobile IHS; and
request a second content retrieval connection through the first provisioning mobile IHS and the at least one assisting mobile IHS such that the requesting mobile IHS can access the content, wherein the second content retrieval connection is different than the first content retrieval connection and is requested in direct response to content retrieval manipulation instructions received from a user by the requesting mobile IHS subsequent to displaying the dynamic content retrieval map.

9. The IHS network of claim 8,
wherein the at least one assisting mobile IHS includes a plurality of assisting mobile IHSs.

10. The IHS network of claim 8, wherein the requesting mobile IHS is configured to:
find a second provisioning mobile IHS that is moving relative to the land mass and the requesting mobile IHS, wherein the second provisioning mobile IHS includes a storage storing the first content that is stored on the first provisioning mobile IHS and that is not stored on the requesting mobile IHS.

11. The IHS network of claim 10, wherein the requesting mobile IHS is configured to:
determine that the connection to the first provisioning mobile IHS is unavailable and, in response, retrieve the content from the second provisioning mobile IHS.

12. The IHS network of claim 10, wherein the requesting mobile IHS is configured to:
access the content through both the first provisioning mobile IHS and the second provisioning mobile IHS.

13. The IHS network of claim 8, wherein the requesting mobile IHS and the first provisioning mobile IHS are provided in respective airplanes and ultra wide radio band communications are used to receive the request from the requesting mobile IHS and to provide the content to the provisioning mobile IHS.

14. The IHS network of claim 8, wherein the requesting mobile IHS and the first provisioning mobile IHS are provided in respective automobiles and Global System for Mobile (GSM) communications are used to receive the request from the requesting mobile IHS and to provide the content to the provisioning mobile IHS.

15. A method for providing a dynamic node network, comprising:
providing a requesting mobile IHS that is moving relative to a land mass;
providing at least one assisting mobile IHS that is moving relative to the land mass and the requesting mobile IHS;
providing a first provisioning mobile IHS that is moving relative to the land mass, the requesting mobile IHS, and the at least one assisting mobile IHS, wherein the first provisioning mobile IHS has direct access to a network element that is not directly accessible by the requesting mobile IHS;
receiving a request to access the network element from the requesting mobile IHS through the at least one assisting mobile IHS by the first provisioning mobile IHS;
providing a first network access connection to the network element for the requesting mobile IHS through the at least one assisting mobile IHS using the first provisioning mobile IHS such that the requesting mobile IHS can access the network element;
receiving network access information by the requesting mobile IHS from each of the first provisioning mobile IHS and the at least one assisting mobile IHS;
using the network access information to generate and display a dynamic network access map on the requesting mobile IHS that provides details about the first network access connection provided by each of the first provisioning mobile IHS and the at least one assisting mobile IHS; and
request a second network access connection by the requesting mobile IHS through the first provisioning mobile IHS and the at least one assisting mobile IHS such that the requesting mobile IHS can access the network element, wherein the second network access connection is different than the first network access connection and is requested in direct response to network access manipulation instructions received from a user by the requesting mobile IHS subsequent to displaying the dynamic network access map.

16. The method of claim 15,
wherein the at least one assisting mobile IHS includes a plurality of assisting mobile IHSs.

17. The method of claim 15, further comprising:
finding a second provisioning mobile IHS that is moving relative to the land mass and the requesting mobile IHS using the requesting mobile IHS, wherein the second provisioning mobile IHS has direct access to the network element that is not directly accessible to the requesting mobile IHS.

18. The method of claim 17, further comprising:
determining that access to the network element by the requesting mobile IHS from the first provisioning mobile IHS is unavailable and, in response, accessing the network element by the requesting mobile IHS from the second provisioning mobile IHS.

19. The method of claim 17, further comprising:
accessing the content by the requesting mobile IHS from both the first provisioning mobile IHS and the second provisioning mobile IHS.

20. The method of claim 15, wherein the requesting mobile IHS and the provisioning mobile IHS are provided in respective people and ultra wide radio band communications are used to receive the request from the requesting mobile IHS and to provide access the network element using the first provisioning mobile IHS.

\* \* \* \* \*